May 17, 1960 W. O. GILES 2,936,698
APPARATUS AND PROCESS FOR CONTINUOUSLY
PRODUCING DEEP FAT FRIED FOOD PRODUCTS
Filed Jan. 17, 1958 4 Sheets-Sheet 4

INVENTOR.
WILLIAM O. GILES,
BY
McMorrow, Berman + Davidson
ATTORNEYS

United States Patent Office 2,936,698
Patented May 17, 1960

2,936,698

APPARATUS AND PROCESS FOR CONTINUOUSLY PRODUCING DEEP FAT FRIED FOOD PRODUCTS

William O. Giles, Orlando, Fla.

Application January 17, 1958, Serial No. 709,592

3 Claims. (Cl. 99—354)

This invention relates to food processing apparatus and, more specifically, to an attachment for a deep fat frying or cooking container for mass producing doughnuts.

One of the primary objects of this invention is to provide an attachment for a deep liquid fat fryer for continuously supplying doughnut batter to a deep fat cooking receptacle together with means operable to move the batter from its point of entry into the receptacle to a discharge station above the level of the liquid fat.

Another object of this invention is to provide, as an attachment to a deep liquid fat fryer receptacle, means for continuously supplying doughnut batter to the receptacle, together with means for moving the batter through a given path of travel from its point of entry into the receptacle to a discharge station above the level of the liquid fat, and means operable at a point disposed substantially midway in the path of travel of the batter to turn the batter upside down to insure the thorough cooking thereof from side to side.

A still further object of this invention is to provide a continuous sequentially operated apparatus and process for deep frying doughnuts and other similar food products.

This invention contemplates, as a still further object thereof, the provision of an attachment of the type generally referred to supra, the attachment being non-complex in construction and assembly, inexpensive to manufacture, and durable in use.

Other and further objects and advantages of the present invention will become more evident from a consideration of the following specification when read in conjunction with the annexed drawings, in which.

Figure 1:
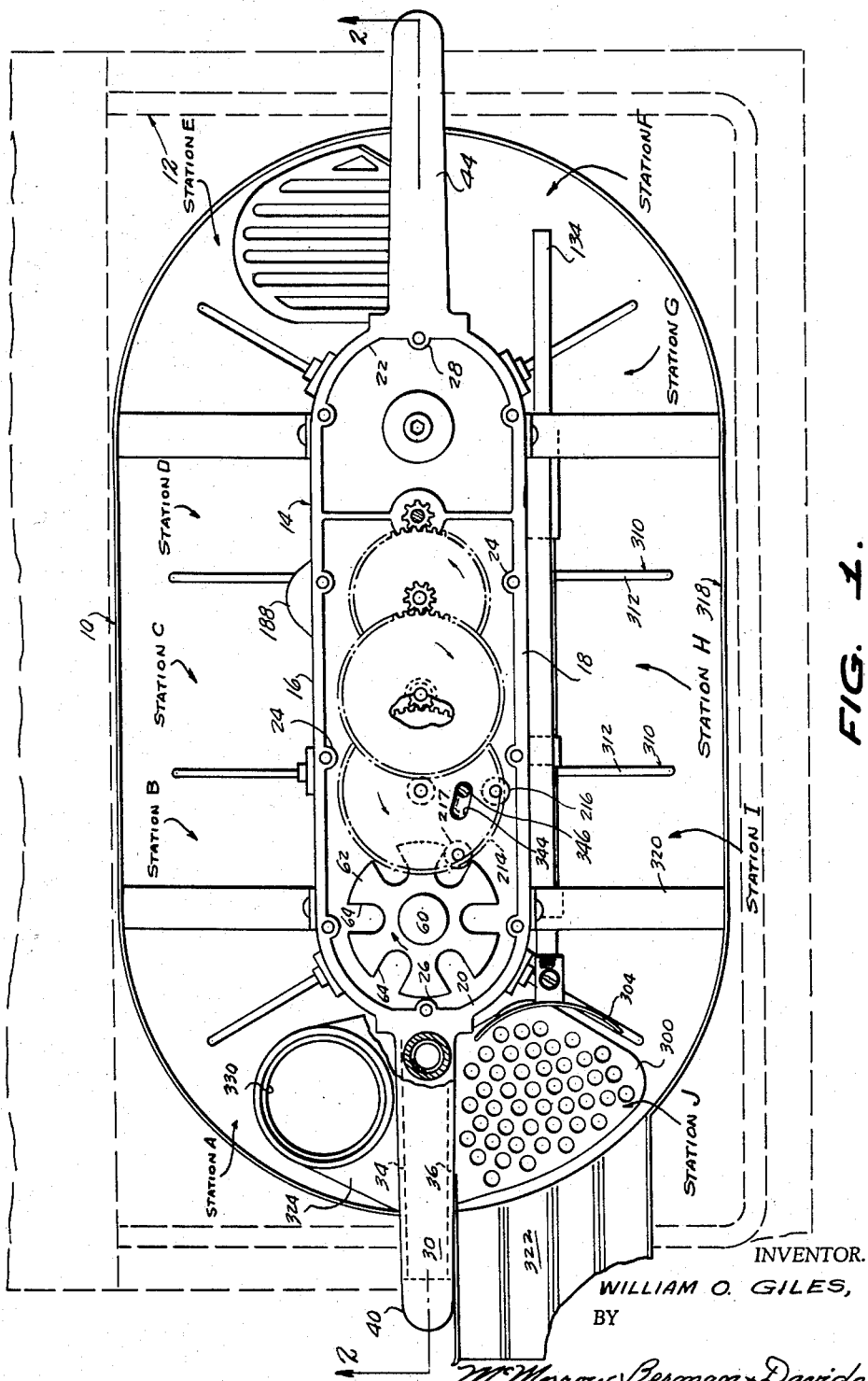
Figure 1 is a top plan view, partly in cross-section, of a doughnut making attachment for a deep fat frying receptacle constructed in accordance with the present invention, Figure 1 being taken substantially on the horizontal plane of line 1—1 of Figure 2, looking in the direction of the arrows.

Referring now more specifically to the drawings, reference numeral 10 designates, in general, a doughnut making attachment for a deep fat frying receptacle, the latter being shown in phantom lines and indicated by reference numeral 12.

Figure 2:
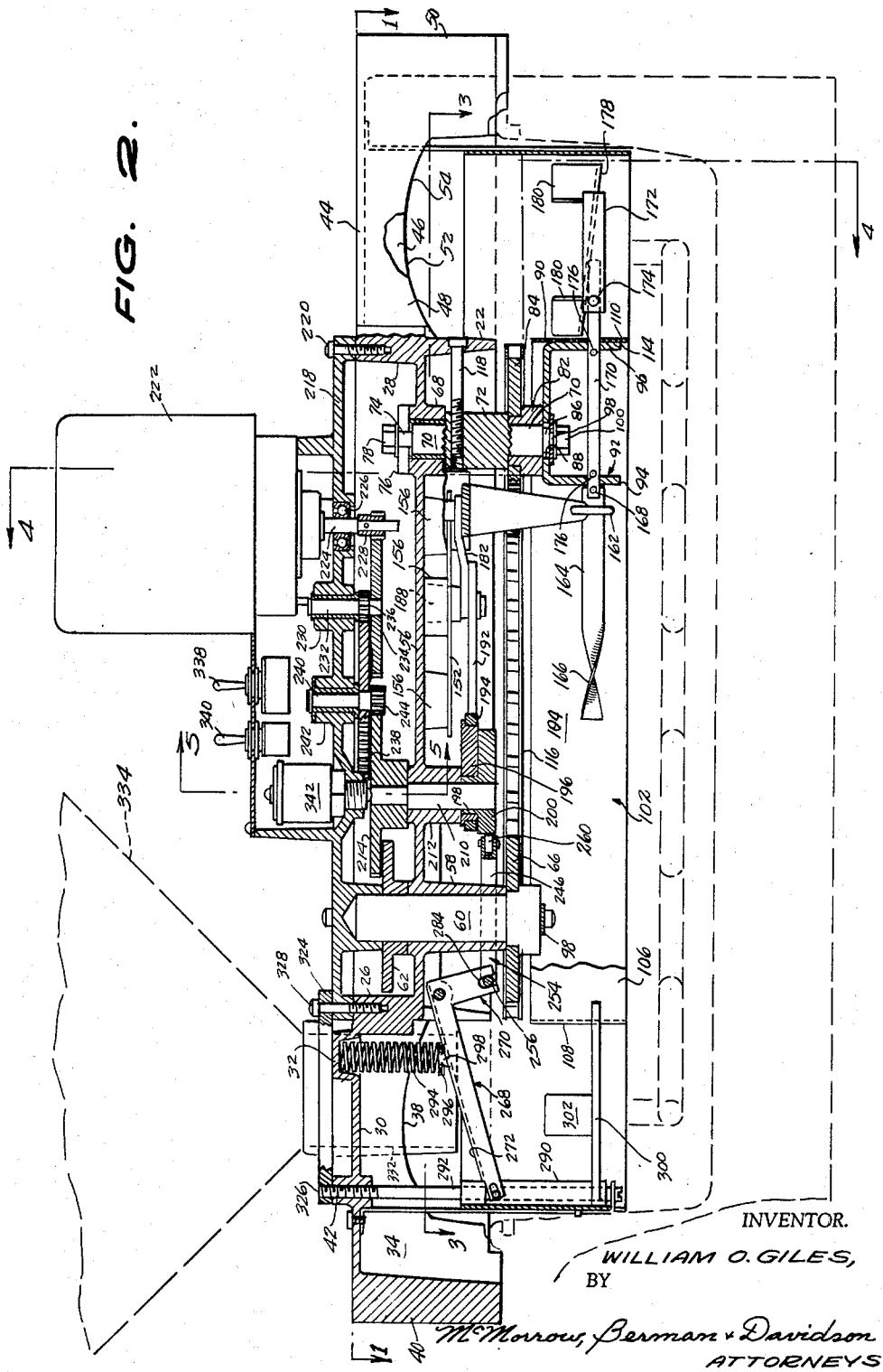
Figure 2 is a detail, longitudinal, cross-sectional view taken substantially on the horizontal plane of line 2—2 of Figure 1, looking in the direction of the arrows.

The attachment 10 is seen to comprise an elongated substantially rectangular head 14 having a pair of laterally spaced, elongated and substantially parallel side walls 16, 18, adjacent pairs of ends which are integrally connected by a pair of arcuately shaped end walls 20, 22. At spaced intervals around the inner periphery of the side walls 16, 18 are provided a plurality of inwardly offset internally threaded bosses 24 and intermediate the ends of the arcuately shaped end walls 20, 22 are provided centrally located bosses 26, 28, respectively. As is seen in Figure 2, a flange 30 is integrally connected with the upper end of the boss 26 and is provided with a downwardly opening spring seat 32 to which further mention will be made. The flange 30 is formed with a pair of longitudinally extending laterally spaced and depending skirts 34, 36 (see Figures 1 and 2) each of which is provided with a downwardly facing arcuate cutout 38 (only one being shown). The flange 30 and skirts 34, 36 terminate at their outer ends in an integrally formed abutment or terminal end 40.

Intermediate the ends of the flange 30 is formed a transversely extending substantially hollow cylindrical boss 42 which also serves a function to be described.

The head 14 at its other end is formed with a second longitudinally extending flange 44 from which depend a pair of integrally formed laterally spaced skirts 46, 48 (see Figure 2), the flange 44 and the skirts 46, 48 terminating at their respective outer ends in an integral abutment 50. As before, the skirts 46, 48 are formed with downwardly opening arcuate cutouts 52, 54, respectively.

A web 56 extends between the side walls 16, 18 and the end walls 20, 22 and is integral therewith. The web 56 adjacent one end thereof, is formed with a transversely extending hollow cylindrical boss 58 (see Figure 2) in which is journalled for rotation a shaft 60. The shaft 60 projects above and below the boss 58 and has a sprocket wheel 62 rigidly secured to the upper end thereof for rotation therewith. As is seen in Figure 1, the sprocket wheel 62 is provided with a plurality of radially spaced slots 64, the function of which will become apparent below. A chain drive gear 66 is rigidly secured to the lower end of the shaft 60 for rotation therewith.

The other end of the web 56 is formed with a transversely extending substantially hollow cylindrical boss 68 in which is loosely received the reduced end 70 of the shaft 72. The end 70 is further reduced in diameter to provide a neck portion 74 which extends above the upper end of the boss 68 and through an apertured washer 76 for threaded engagement with a nut 78. The other end of the shaft 72 is provided with a reduced neck portion 80 which receives thereon a shouldered bushing 82, on which is rotatably supported a chain gear wheel 84. The aforementioned other end of the shaft 72 terminates in a reduced neck portion 86 which extends loosely through an opening 88 formed in one end of the bight 90 of an inverted substantially U-shaped, longitudinally extending bracket 92 having longitudinally spaced and substantially parallel arms 94, 96 depending, respectively, from the opposed ends thereof and through one of a plurality of cross braces 98. The assembly is maintained by means of a nut 100 which is threaded on the terminal end of the neck 86.

Reference numeral 102 denotes, in general, an elongated substantially rectangular splash guard having a pair of elongated laterally spaced side walls 104, 106 having their respective adjacent ends connected by end walls 108, 110.

Figure 4:
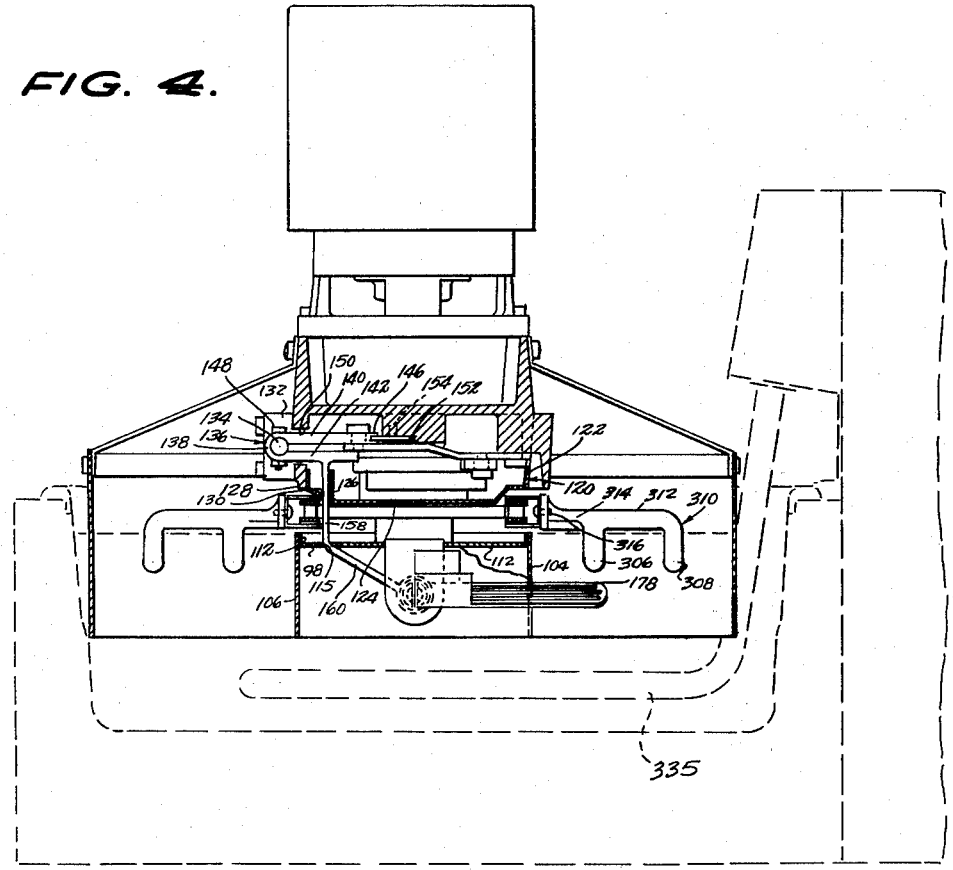
Figure 4 is a detail cross-sectional view taken substantially on the line 4—4 of Figure 2, looking in the direction of the arrows; and, Figure 5 is a detail cross-sectional view taken substantially on the vertical plane of line 5—5 of Figure 2, looking in the direction of the arrows.

As is seen in Figure 4, the splash guard 102 includes a top wall 114 fixedly secured to the upper side and end walls, the top wall 114 having an elongated longitudinally extending slot 115 formed therein.

An endless link chain 116 is trained around the chain gear wheels 66, 84 to place the same in driving relation, and chain slack takeup means are provided which includes an elongated screw 118 that extends through the end wall 22 and is threaded into the shaft 72. As has been described above, the reduced end 70 of the shaft 72 is loosely received within the boss 68 and the reduced neck portion 86 is loosely received within the opening 88 whereby rotation of the screw 118 will effect longitudinal adjustment of the shaft 72.

A second splash pan 120 (see Figure 4) includes a side wall 122, a central wall 124 extending parallel to the top wall 112, and an elongated vertical side wall 126, the latter extending substantially parallel to an elongated flange 128 affixed to and depending from the underside of the head 14. The adjacent sides of the side wall 126 and the flange 128 are spaced from each other to form an elongated slot 130 vertically spaced from and aligned with the slot 112.

A plurality of bushings 132 are fixedly secured to one side of the head 14 in longitudinally spaced relation and slidably receive an elongated substantially cylindrical rod 134 for reciprocation therethrough, the rod 134 being elevated above the chain 116.

A substantially C-shaped carriage is indicated at 136 and is seen to comprise (see Figure 4) a substantially semi-circular bight 138 having a pair of vertically spaced laterally extending and parallel side arms 140, 142 of which the former is somewhat longer and is bifurcated to form a slot 144. Each of the ends of the bifurcated side arm 140 is, in turn, bifurcated at 146 with the longitudinal axis of the bifurcations 146 being disposed at right angles with respect to the longitudinal axis of the slot 144.

As is seen in Figure 4, the bight 138 extends around the rod 134 and is connected thereto by a pin 148, and the arms 140, 142 project through a longitudinally extending recess 150 formed in the side wall 18 with the bifurcated ends 146 of the side arm 140 slidably engaging and receiving therein one side of an elongated substantially rectangular guide strip or track 152 affixed by screws 154 to the lower ends of a plurality of lugs 156 depending from the web 56.

The side arm 142 is integrally connected to one end of a lever 158 which depends therefrom and is slidably received within the aligned slots 130, 115 and which terminates in an angularly offset end portion 160. To the lower end of the offset end portion is fixedly secured a ring 162 (see Figure 2) which slidably surrounds an elongated substantially rectangular flap lever 164. At one end the lever 164 terminates in an Archimedean screw 166 while the other end thereof is connected at 168 to one end of a shaft 170. The shaft 170 is journalled for rotation in the arms 94, 96 of the bracket 92. The other end of the shaft 170 projects through the end wall 110 and is telescoped within one end of an elongated substantially hollow tubular element 172. The element 172 and the aforementioned other end of the shaft 170 are held against movement relative to each other by means of a pin 174. Axial shifting of the shaft 170 is prevented by stop pins 176.

To the tubular element 172 is secured one end of a grid-type spatula 178, the spatula normally being inclined at an actuate angle with respect to the longitudinal axis of the element 172. The spatula 178, adjacent its connected end, is formed with a pair of laterally spaced, upright and angularly inclined stops or abutments 180.

From the foregoing description it should now be evident that as the carriage 136 shifts on the rod 134 to the left as viewed in Figure 2, the ring 162 will engage the Archimedean screw 166 causing the lever 164 and the shaft 170 to rotate. Rotation of the shaft 170 effects rotation of the element 172 which, in turn, forces the spatula 178 to move from its normal position illustrated in Figure 3 to an inverted position on the other side of the longitudinal axis of the element 172. Movement of the carriage 136 in the opposite direction will cause the spatula 178 to return to its position illustrated in Figure 3 of the drawings.

Movement of the carriage 136 is achieved by a lever 182 (see Figures 2 and 3) having a roller 184 at one of its ends slidably engaged within the slot 144. The other end of the lever 182 is pivotally connected at 186 to a boss 188 (see Figures 1 and 2) projecting laterally from the side walls 16. Adjacent the pivotal connection 186, the lever 182 carries a depending pin 188 (see Figure 3) which works within a longitudinally extending slot 190 at one end of a cam lever 192 having an enlarged laterally extending apertured eccentric head 194. The head 194 receives a substantially circular flat disc or insert 196 which is eccentrically bored to receive a hub 198 of a cam 200. The cam 200 is formed with a pair of opposed high and low arcuately shaped ends 202, 204, respectively, and a pair of elongated oppositely disposed sides 206, 208. The cam 200 is apertured adjacent its low end 204 and is secured to the lower end of a vertical shaft 210 journalled for rotation in a boss 212 depending from the web 56. A gear wheel 214 is fixedly secured to the upper end of the shaft 210 and has a portion thereof overhanging a portion of the gear 62. Depending rollers 216, 217 (see Figure 1) depend from the underside of the gear wheel 214 in circumferentially spaced relation and are adapted to enter the slots 64 of the sprocket wheel 62. Reference numeral 218 designates an elongated substantially rectangular cover plate for the head 14 which is releasably secured thereto by means of a plurality of screws 220. Mounted on the upper side of the cover plate 218 is an electric motor 222 having a drive shaft 224 journalled in a bearing 226 and having a pinion 228 fixedly secured thereto. A boss 230 extends transversely through the cover plate 218 and has rotatably journalled therein a shaft 232 having a gear 234 secured thereon for rotation therewith, the gear 234 being in mesh with the pinion 228. A pinion 236 is also fixedly secured to the shaft 232 and meshes with a gear 238 fixedly secured to the lower end of a shaft 240 supported for rotation in a boss 242 extending transversely through the cover plate 218.

The lower end of the shaft 240 has affixed thereto a pinion 244 which meshes with the gear wheel 214.

Thus, upon energization of the electric motor 222 the shaft 210 is caused to rotate through the above described gear train thereby effecting actuation of the cam lever 192 and the cam 200. Actuation of the cam lever 192 causes the carriage 136 to reciprocate on the rod 134 in the manner heretofore described.

Figure 3:
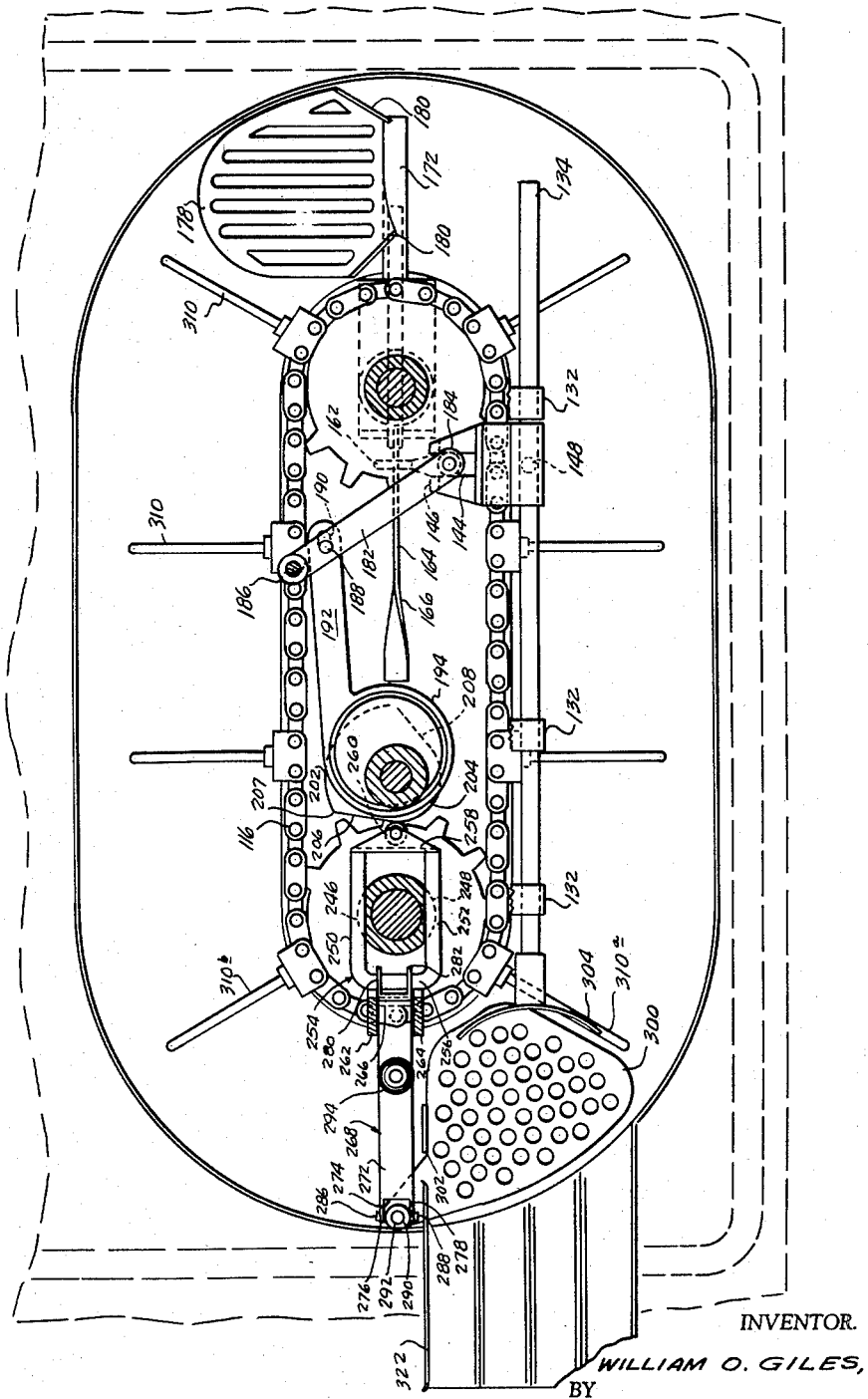
Figure 3 is a longitudinal, detail cross-sectional view taken substantially on the horizontal plane of line 3—3 of Figure 2, looking in the direction of the arrows.

As is seen in Figure 3, the boss 58 adjacent its lower end is provided with a pair of diametrically opposed keyways 246, 248 which slidably receive the guide members 250, 252, respectively, of a yoke 254. The adjacent pairs of ends of the side members 250, 252 are integrally connected by end members 256, 258, the latter having a cam follower roller 260 fixedly secured thereto and adapted to track the cam 200. To serve a function to be described, the end member 256 is substantially circular in transverse cross-section.

The head 14 includes a pair of laterally spaced uprights 262, 264 (see Figure 3) to which is pivotally connected on pivot pin 266 one end of an L-shaped channel lever having an elongated leg portion 268 and a foot portion 270. The leg portion 268 comprises a bight 272 recessed at its outer end 274 to provide a pair of side wall extensions 276, 278. The bight of the foot portion 270 is cut away to leave a pair of laterally spaced side walls 280, 282 the outer ends of which are each recessed, as at 284 (see Figure 2) for insertion over and for pivotal connection with the end member 256 of the yoke 254.

The side wall extensions 276, 278 are pivotally connected on a pair of diametrically opposed pins 286, 288 which project from an elongated tubular sleeve 290 telescoped for reciprocation on a normally upright shaft 292 having an end threaded into the boss 42 and projecting thereabove. A helicoidal spring 294 under compression has one of its ends seated in the spring seat 32 and the other end thereof abuts against a keeper 296 pivotally supported at 298 on the bight 272. Thus, in this described construction, the leg portion 272 is constantly biased for movement in a counterclockwise direction (as viewed in Figure 2) thereby urging the yoke 254 for sliding movement to the right whereby the cam follower roller 260 is maintained in engagement against the cam 200. To the lower end of the sleeve 290 is fixedly secured a horizontal perforate platform 300 having an abutment 302 arising from an end thereof. To serve a function to be explained below, the platform 300 may be elevated to a point immediately below an arcuate doughnut engaging member 304 fixedly secured to one end of the rod 134.

The platform 300, at its lowermost position, is disposed in a plane below the lowermost ends of the arms 306, 308 of a plurality of regularly spaced inverted substantially U-shaped conveyor elements 310 having a bight 312 including an extension 314 rigidly connected at 316 to the chain 116 in such a manner as to project laterally therefrom substantially perpendicular with respect thereto. The spacing between each adjacent pairs of conveyor elements 310 is slightly greater than the outside diameter of the doughnuts to be prepared.

The conveyor elements 310 are surrounded by a vertical continuous wall 318 supported from the head 14 on a plurality of spaced hangers 320.

The upper edge of the wall 318 is substantially flush with the plane of the platform 300 when elevated to its uppermost position, and the wall 318 has projecting laterally therefrom a doughnut discharge slide 322 located in juxtaposition relative to the platform 300 when the platform is in its last described position.

As is seen in Figure 1, the platform 300 is located adjacent one side of the terminal end 40. A support plate 324 extends laterally to the other side thereof and is rigidly secured on the bight 30 and to the cover plate 218 at the points 326, 328, respectively. The support plate 324 is apertured at 330 and from the circumferential marginal edge thereof depends an inverted frusto-conical guide 332 adapted to receive the funnel shaped end of a doughnut batter hopper 334 shown in phantom lines in Figure 2.

The hopper 334 is of conventional construction and includes a mechanism for releasing, periodically, a given amount of doughnut batter in response to electrically timed apparatus which forms no part, per se, of the present invention. However, this apparatus and mechanism will be briefly referred to below to lend a complete understanding to this invention.

Figure 5:
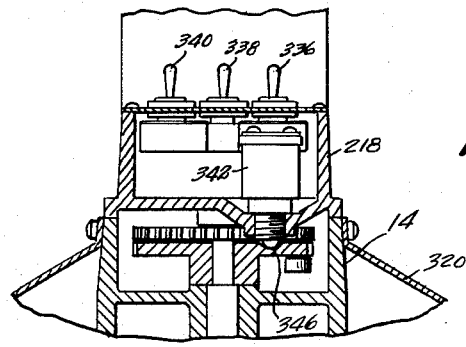

As has been set forth above, the attachment 10 is supported on the upper end of a deep fat fryer receptacle 12 with the arms 306, 308 of the conveyor elements 310 immersed in the liquid fat which is maintained in its liquid state by means of an electrical heating unit 336 disposed in the receptacle 12 and connected in a suitable electric circuit controlled by a switch 338 supported on the cover plate 218 (see Figure 5).

Also supported on the cover plate 218 is a control switch 338 connected in the circuit to the motor 222, and a third switch 340 connected in series with a normally open single pole single throw switch 342, the latter being biased for movement to its closed position. The switch 342 is in an electric circuit controlling the operation of the apparatus for effecting discharge of doughnut batter from the hopper 334.

The switch 340 is fixedly secured to the cover plate 218 above the gear 214, the gear 214 having a small arcuate slot 344 formed therein to cyclically receive the actuating element 346 of the switch 342 (see Figures 1, 2 and 5). The switch 342 will be hereinafter referred to as the hopper actuating switch.

Having described the component elements of this invention in detail, the operation thereof is set forth below.

Let it be assumed that the switches 336, 338 and 340 are in their respective closed positions and that the component parts of the invention are in their respective illustrated positions. The motor 222 now being energized drives the gears 234, 238 and 214 through the pinions 228, 236 and 244, the gears turning in the direction of their respective arrows. Under these conditions, the actuating element 246 of the hopper actuating switch 242 has just entered the leading end of the slot 344 and the roller 217 has just lost driving relation with the sprocket wheel 62.

To facilitate the understanding of the operation of this attachment the space between the abutment 302 and the next adjacent conveyor element 310, reading clockwise on Figure 1, is designated as station A and, continuing to read in the same direction, station B designates the last named conveyor element and the next adjacent thereto, and so on around the attachment to define stations C and D. Station E is delineated by the abutments 180 and the adjacent conveyor element 310 reading counterclockwise. Station F extends between the abutments 180 and the next adjacent conveyor element 310 reading clockwise on Figure 1. Stations G, H and I are defined in the same manner as stations B, C and D, and station J extends between the abutment 302 and the next adjacent conveyor element 310 reading counterclockwise.

Now let it be assumed that the component elements of the attachment are in their respective positions as illustrated in the drawings with the attachment 10 empty of doughnut batter but with batter being disposed in the hopper 334. Let it also be assumed that the switch 336 has been closed and that the heating element 335 has brought the fat in the receptacle 12 to its proper frying temperature. The operator now closes the switches 338 and 340 to energize the motor 222 to drive the gears 234, 238 and 214 through the pinions 228, 236 and 244, the gears turning in the direction of their respective arrows.

At this moment two important points should be made. First, the roller 217 has just lost its driving relation with the slot 64 thereby halting the rotation of the shaft 60 and also the rotation of the gear 66 connected thereto. With no power directed to the gear 66 the chain 116 is rendered motionless and consequently the conveyor elements 310 remain stationary. Secondly, at this time, the switch actuating element 346 of the hopper actuating switch 342 has just entered the leading end of the arcuate slot 344 closing the circuit to the hopper actuating mechanism and causing the hopper to discharge into station A a batch of uncooked doughnut batter. The aforementioned mechanism remains operative until the gear 214 turns through an arc sufficiently great as to cause the switch actuating element 346 to ride out of the trailing end of the slot 344 and onto the upper side of the gear 214 thus breaking the circuit control by switch 342.

Gear 214 continues its rotation and brings the roller 216 into driving engagement with a second one of the slots 64 of the sprocket wheel 62. As the sprocket wheel 62 is driven the shaft 60 rotates and drives gear 214, the latter in turn, driving the chain 116. As the chain 116 advances clockwise the last named conveyor element 310 engages the batter and pushes it ahead in the liquid fat. Continued rotation of the sprocket wheel 62 is achieved as the roller 216 leaves its associated slot 64 by the engagement of the roller 217 into the next succeeding slot 64. This advances the aforementioned last named conveyor element to the original position of the first mentioned one thereof and disposes the doughnut batter in station B. At this time the roller 217 leaves its associated slot 64 rendering the shaft 60 inoperative and the chain 116 motionless. The gear wheel 214 continues to rotate, however, and again presents the leading end of the slot 344 to the switch actuating element 346 at which time the above described sequence of operations takes place, but in this instance the batter in station B advances to station C, with a new batch of batter being deposited in station A.

Continued sequential actuation of the attachment 10 advances the first batch of batter into station E over the spatula 178, and at this point the batter has cooked substantially through the lower half thereof. The spatula 178 is utilized to invert the batter in the fat to thoroughly cook the original upper half thereof. To effect this inversion the following operational steps occur.

Reference is now made to Figures 1 and 3, and at this point it must be remembered that shaft 210 continues to rotate as long as the motor 222 remains energized.

When the switch actuator 346 enters the leading end of the slot 344 the high side of the insert or cam 196 begins to draw the cam lever arm 192 towards the left as viewed in Figure 3. No movement of the lever 182 occurs, however, by virtue of the lost motion connection between the pin 188 and the slot 190. The length of the slot 190 is such that the switch actuating element 346 has opened and closed the switch 342 as described above. Now, as the pin 188 engages the other end of the slot 190 the lever 182 pivots about the point 186 in a clockwise direction effecting movement of the carriage 138 to the left, reference being made to Figure 3, and draws the ring 162 in the same direction on the lever 164 towards the Archimedean screw 166. The ring 162, upon engagement with the screw 166 causes the spatula to turn through an arc greater than ninety degrees (approximately one hundred degrees) or through an arc sufficiently great to disengage the first batch of batter therefrom and from the abutments 180 for inverted deposit in station F. The intermittent operation of the chain 116, as described above, next moves the second batch of batter into station E above the spatula 178 while moving the first batch of batter into station G.

The above sequence of operations is continuously repeated moving the first batch of batter through stations H, I and finally into station J. At station J the first batch of batter has been completely cooked and is positioned above the platform 300 ready for removal from the receptacle 12.

Attention is now directed to Figures 1, 2 and 3. With the cooked doughnut over the platform 300 the cam 200 turns to gradually present its high side 206 to the cam follower roller 260 and as the roller traces this surface the yoke 254 is pushed to the left, as viewed in Figures 2 and 3, to pivot the leg portion 268 of the channel shaped lever upwardly thereby elevating the platform 300 and the doughnut thereon. After the roller passes the apex 207 of the high side of the cam 200 the cam follower roller 260 rides on the end 202 thereof which has a radius of curvature equal to the radius of the apex 207. Thus, the platform 300 is held in an elevated position for that period of time required for the end 202 to pass the roller 260.

It now becomes important to examine the timing relationship between the afore described insert or cam 196 and the cam 200. In operation, the apex 207 of the cam 200 is presented to the roller 260 just prior to the time the high side of the cam 196 effects movement of the carriage 138 for the carriage 136 is rigidly secured to the push rod 134 having the arcuate doughnut engaging member 304 affixed thereto.

Thus, when the roller 260 strikes the apex 207 the cam 196 initiates movement of the lever 182 causing the carriage 136 and the push rod 134 to move towards the platform 300 whereby the member 304 engages the cooked doughnut thereon and pushes it onto the discharge slide 322. At the same time, the spatula 178 is rotated as described supra.

As the roller 260 begins to trace the descending side 208 of the cam end 202 the leg portion 268 pivots in the opposite direction to effect gradual lowering of the platform 300 until it starts to trace the low end 204 at which time further descent is prevented.

As the platform 300 begins its descent the cam 196 rotates to effect movement to take up the lost motion between the pin 188 and slot 190 and thereafter to shift the carriage 136 in the opposite direction to return the ring 162, spatula 178 and the carriage to their respective original positions.

From the foregoing description of this invention it now becomes apparent that with each 360 degree rotation of the gear 214 there occurs, in sequential order, (1) discharge of uncooked doughnut batter into the receptacle 12, (2) movement of each of the conveyor elements 310 across one of the stations, (3) elevation of the platform 300 followed by, (4) actuation of the carriage 136 to effect ejection of a cooked doughnut from the platform 300 by means of the push rod 134 and simultaneous rotation of the spatula 178 to invert a partially cooked doughnut and (5) return of the platform, push rod, carriage and spatula to their original positions.

Having described and illustrated one embodiment of this invention in detail, it will be understood that the same is offered merely by way of example, and that the instant invention is to be limited only by the scope of the appended claims.

What is claimed is:

1. Food processing apparatus comprising a head member, a pair of gear wheels mounted for rotation on said head member, an endless chain chained around said gear wheels, a motor mounted on said head member, means on said head member connecting said motor with said chain in intermittent driving relation, a spatula supported for pivotal movement on said head member, means actuated by said motor to effect said pivotal movement of said spatula while said chain is motionless, a platform mounted on said head for reciprocation thereon in a direction normal to the longitudinal axis of said chain, means actuated by said motor to effect reciprocation of said platform when said chain is motionless, ejector means mounted on said head member for extension and retraction across said platform, and a plurality of conveyor elements secured to said chain and projecting laterally therefrom in longitudinal spaced relation.

2. Food processing apparatus comprising a receptacle having a cooking fluid therein, means for heating said fluid, a head member disposed within said receptacle, an endless chain mounted on said head member for movement therearound in one direction, a plurality of conveyor elements connected to said chain in spaced relation relative to each other and projecting laterally therefrom in a direction away from said head, said elements being submerged in said fluid and movable in a horizontal direction, means for intermittently driving said chain and thus said elements, a spatula supported for oscillatory movement on said head and below said elements, said spatula being positioned between a pair of adjacent elements when said chain is motionless, and timed means for effecting said oscillatory movement of said spatula through sequential arcs of less than 360 degrees in clockwise and counterclockwise directions to invert the article being cooked in said receptacle and to return to its original position between said adjacent pair of elements while said chain is motionless.

3. Food processing apparatus as defined in claim 2, and timed means for depositing the raw material to be cooked between a pair of adjacent conveyor elements, a platform mounted on said head for reciprocation thereon in a direction normal to the path of movement of said chain, said platform being normally disposed below said elements and between a pair of adjacent ones of said elements when said last named elements are stationary, and means reciprocating across said platform for ejecting a cooked article therefrom.

References Cited in the file of this patent

UNITED STATES PATENTS

| | | |
|---|---|---|
| 1,641,118 | Carpenter | Aug. 30, 1927 |
| 2,088,946 | Carpenter | Aug. 3, 1937 |
| 2,107,325 | Carpenter | Feb. 8, 1938 |
| 2,201,364 | Carpenter | May 21, 1940 |
| 2,207,316 | Ferry | July 9, 1940 |
| 2,778,736 | Wagner | Jan. 22, 1957 |